United States Patent [19]

Hararat-Tehrani

[11] Patent Number: 5,217,184
[45] Date of Patent: Jun. 8, 1993

[54] RETAINING WALL FOR HOLDING CARGO IN AN AIRCRAFT CABIN

[75] Inventor: Mohammad Hararat-Tehrani, Bremen, Fed. Rep. of Germany

[73] Assignee: Deutsche Aerospace Airbus GmbH, Hamburg, Fed. Rep. of Germany

[21] Appl. No.: 883,425

[22] Filed: May 13, 1992

[30] Foreign Application Priority Data

May 18, 1991 [DE] Fed. Rep. of Germany ....... 4116443

[51] Int. Cl.⁵ .............................................. B64D 1/10
[52] U.S. Cl. .................. 244/118.1; 244/121; 410/129; 410/121; 267/30
[58] Field of Search ..................... 244/118.1, 119, 121; 410/121, 122, 123, 129, 130; 267/81, 83, 86, 42, 43, 30; 114/219

[56] References Cited

U.S. PATENT DOCUMENTS

| | | |
|---|---|---|
| 3,507,123 | 4/1970 | Miura .................................. 114/219 |
| 4,736,932 | 4/1988 | Haslim . |
| 4,957,250 | 9/1990 | Hararat-Tehrani . |
| 5,085,382 | 2/1992 | Finkenbeiner .................... 244/118.1 |
| 5,102,107 | 4/1992 | Simon et al. .......................... 267/30 |

FOREIGN PATENT DOCUMENTS

| | | |
|---|---|---|
| 2408251 | 9/1975 | Fed. Rep. of Germany ...... 410/121 |
| 3827278 | 2/1990 | Fed. Rep. of Germany ... 244/118.1 |
| 3827281 | 2/1990 | Fed. Rep. of Germany ...... 410/121 |

Primary Examiner—Joseph F. Peters, Jr.
Assistant Examiner—Anne E. Bidwell
Attorney, Agent, or Firm—W. G. Fasse

[57] ABSTRACT

A retaining wall for intercepting and holding freight pieces in a cargo hold of an aircraft cabin is provided with two parallel wall sections enclosing a space in which there are mounted elastically deforming hollow spring tubes which have an elliptical cross-section and are so arranged that the small axis of the ellipse is oriented in the direction of impact, while the long axis of the ellipse is oriented perpendicularly to the impact direction. The spring tubes may have a layered construction for a controlled spring characteristic. The elastic energy damping of the spring tubes may be combined with a friction energy absorption device.

18 Claims, 4 Drawing Sheets

RETAINING WALL FOR HOLDING CARGO IN AN AIRCRAFT CABIN

FIELD OF THE INVENTION

The invention relates to a retaining wall for intercepting and holding cargo pieces in an aircraft cabin to prevent such cargo pieces that may have become loose, from moving in the cabin in an uncontrolled manner. Such retaining walls are installed inside an aircraft body to separate a passenger space from a cargo hold. Mounting components are used for securing the retaining wall to the ceiling and floor of the aircraft.

BACKGROUND INFORMATION

German Patent (DE-PS) 3,827,278, corresponding to U.S. Pat. No. 4,957,250 (Hararat-Tehrani) discloses a retaining wall for intercepting and holding of cargo pieces in a transport cabin. The known retaining wall comprises mechanical energy absorbing friction elements arranged between two wall panels. The friction elements are permanently deformed by an impact so that they must be replaced.

It is also known to secure such retaining or intercepting walls by means of mechanical friction dampers or shock absorbers which secure at least one of the two wall panels to a mounting rail or the like in the aircraft floor.

U.S. Pat. No. 4,736,932 (Haslim) discloses seat cushions with spring elements having an oval cross-section. Such seat cushions are not suitable for intercepting and retaining cargo pieces that have become loose on an aircraft floor.

OBJECTS OF THE INVENTION

In view of the above it is the aim of the invention to achieve the following objects singly or in combination:

to construct a retaining wall of the type mentioned above that is capable of taking up or absorbing impact energy in an elastic manner to a certain level of impact energy so that the retaining wall will not be permanently deformed;

to arrange a plurality of elastically yielding tubular elements in series for increasing the energy absorption capability of the retaining wall;

to arrange the tubular spring elements having an elliptical cross-section so that the short axis of the ellipse is oriented in the impact direction of the energy to be absorbed;

to combine elastic energy damping elements with friction energy absorbers in such a way that impacts up to certain force, an elastic energy damping will take place and so that larger impact forces above a certain threshold will be absorbed by a permanent deformation of respective frictional energy absorbers; and to mount such a retaining wall to the aircraft body by a mechanical friction damper device.

SUMMARY OF THE INVENTION

The retaining wall according to the invention is characterized in that elastically operating energy absorbing longitudinal hollow spring tubes are sandwiched between a first impact facing wall section and a second wall section wherein each of the hollow spring tubes has an elliptical hollow cross-section.

The present wall has the advantage that the energy absorption takes place primarily, up to a certain threshold impact force, as a spring elastic energy damping, whereby impacts below the threshold are elastically dissipated and do not permanently deform the hollow spring tubes. By providing the individual hollow spring tubes with an elliptical cross-section, an efficient space utilization is accomplished even where a substantial number of these spring tubes are assembled, either between two wall panels or between the spaces formed between a plurality of wall panels, whereby a plurality of intermediate wall sections or panels are positioned between two outer wall sections. Where only two wall panels or sections are used, the spring tubes are arranged preferably horizontally one above the other. Where a plurality of wall sections are used, the spring tubes in neighboring spaces are preferably arranged in series with each other, namely one behind the other in the impact direction. The absorption capacity is increased by the number of wall sections arranged one behind the other in the impact direction.

Each individual shock damping spring tube is constructed of several layers, the materials and characteristics of which are so selected that the spring effect and the impact or energy absorption is accomplished in an optimal manner. Especially the arrangement of an intermediate layer made of a spring metal, such as spring steel, between a radially outer layer and a radially inner layer is well suited for determining the spring characteristic of the tubular springs or spring tubes.

It has been found that an optimal energy absorption is accomplished if the short axis of the elliptical cross-section is oriented in the direction of impact. For this purpose the individual shock damping spring tubes are arranged between the wall sections in such a way that their long wall segments having a large radius rest against the surface of the respective wall section or panel while the short wall segments having a smaller radius of curvature bridge the spacing between two neighboring wall sections. In this manner a large surface contact is provided between the wall surfaces and the impact damping spring tubes. A further improved contact is achieved by providing at least one of the large segment wall surfaces with flanges facing outwardly and in opposite directions away from each other. Preferably, the flanges form a longitudinal through-slot in the elliptical cross-section of the respective tube spring. Preferably, these flanges contact the wall surface of that wall section which is not the first one to receive the impact force. In other words, these flanges contact the wall surface away from the wall closer to the load in the cargo hold.

In the embodiment which comprises a plurality of intermediate wall sections, the spring tubes are arranged in horizontal planes in series, as viewed in the impact direction, whereby neighboring spring tubes are separated by the intermediate wall sections. All spring tubes in the same horizontal plane are referred to as a group and a vertical spacing is maintained between neighboring groups. This vertical spacing is preferably uniform so that a uniform energy absorption is assured.

Preferably, the first wall section facing an impact is constructed with a honeycomb interior for an improved impact resistance.

It is also possible, according to the invention, to achieve a stage-wise energy absorption by providing the spring tubes of a horizontal group sequentially with different deformation and/or spring characteristics. For example, the wall thickness of the spring tubes can increase from the wall section facing the impact toward the last wall section. Where the tube springs are constructed of a radially outer layer, a radially inner layer, and an intermediate layer, it is satisfactory for this staged impact damping to make the intermediate layer, for example, thicker from the impact wall toward the last wall. With this construction any remaining impact force is taken up by the last wall section as viewed in the impact direction.

A further embodiment of the invention comprises a retaining wall as described above combined with mechanical friction energy absorbing elements which are arranged in line and thus in the same planes as the spring tube or groups of spring tubes. The longitudinal axes of the spring tubes extend at right angles to the impact direction while the longitudinal axis of the individual friction energy absorbers extends in line with the impact direction. The energy absorbers bear against a further wall section forming a rear wall as viewed in the direction of the impact. In this combination of elastically yielding energy dampers with plastically deforming energy absorbers, the take-up of energy can also take place in steps or stages.

Any of the above described embodiments may be secured to the aircraft floor, for example, to a mounting rail or the like, by a mechanical friction damper, one end of which is secured to a part of the retaining wall, while the other end is secured to the aircraft floor or aircraft structure. These mechanical friction dampers for the mounting of the retaining wall are tiltably pivoted to the wall and to the mounting rail so that there is a certain freedom of movement for the last or rear wall section.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
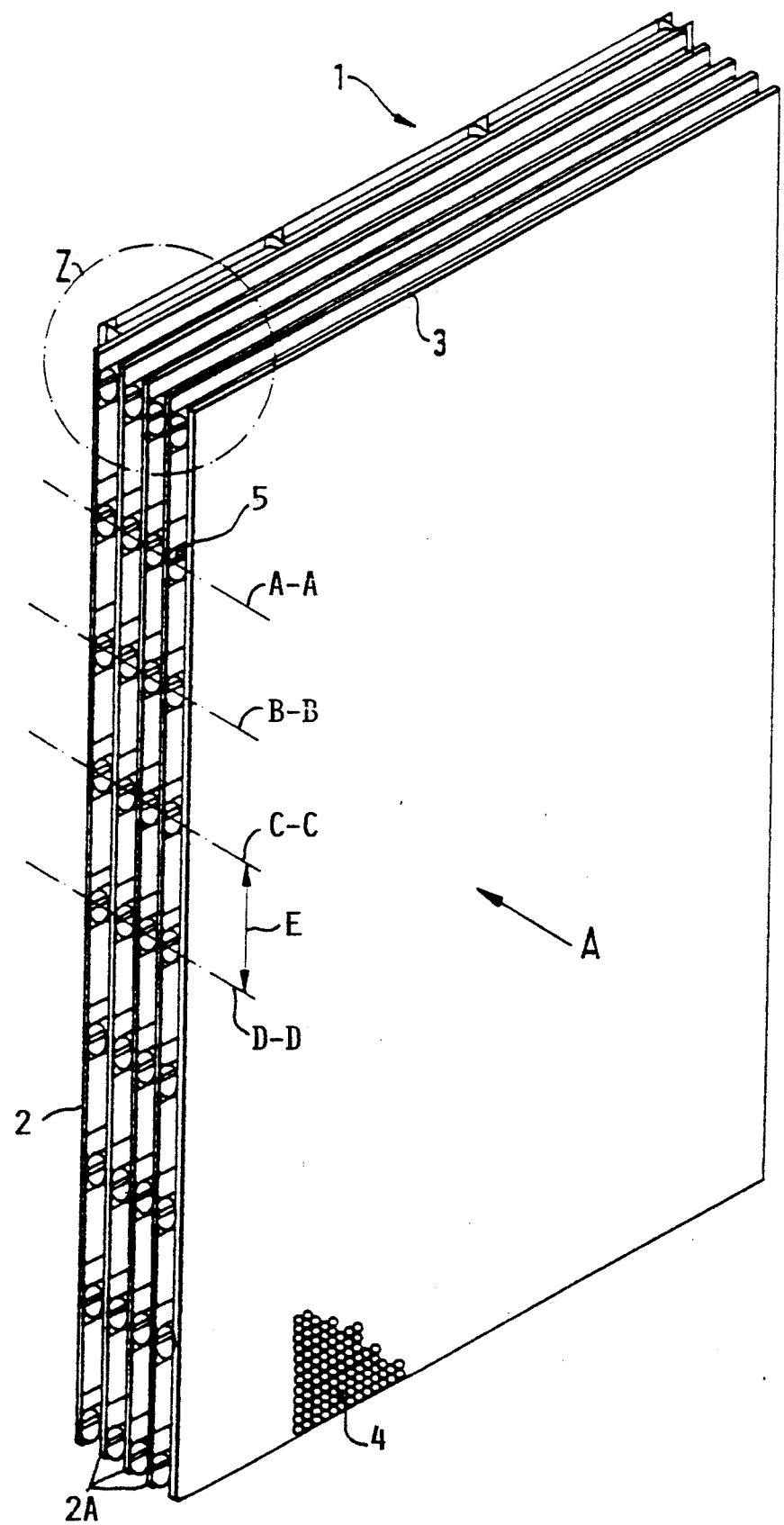
FIG. 1 is a perspective view of a retaining wall according to the invention illustrating the arrangement of hollow springs constructed as spring tubes with an elliptical cross-section arranged in the spaces between neighboring wall sections.

FIG. 1 shows a retainer wall 1 according to the invention, comprising a first wall section 3 facing in the impact direction A, a second wall section 2 forming, in the shown example, a rear wall section, a plurality of intermediate wall sections 2A, and a number of impact damper spring tubes 5 arranged in the spaces between neighboring wall sections. The first wall section 3 is preferably provided with a honeycomb type core 4 as shown at the bottom of FIG. 1.

Each of the individual impact damper spring tubes 5 has an elliptical cross-section as will be described in more detail below with reference to FIG. 3. The spring tubes 5 are arranged in horizontal planes A—A, B—B, C—C, D—D, and so forth. As shown, each group of spring tubes 5 comprises four such spring tubes. However, one spring tube may be sufficient for certain purposes where light loads are to be restrained. In any event, the spring tubes 5 between two neighboring wall sections are vertically spaced from each other by a spacing E which is preferably uniform throughout the retainer wall to assure a uniform shock absorption.

Figure 2:
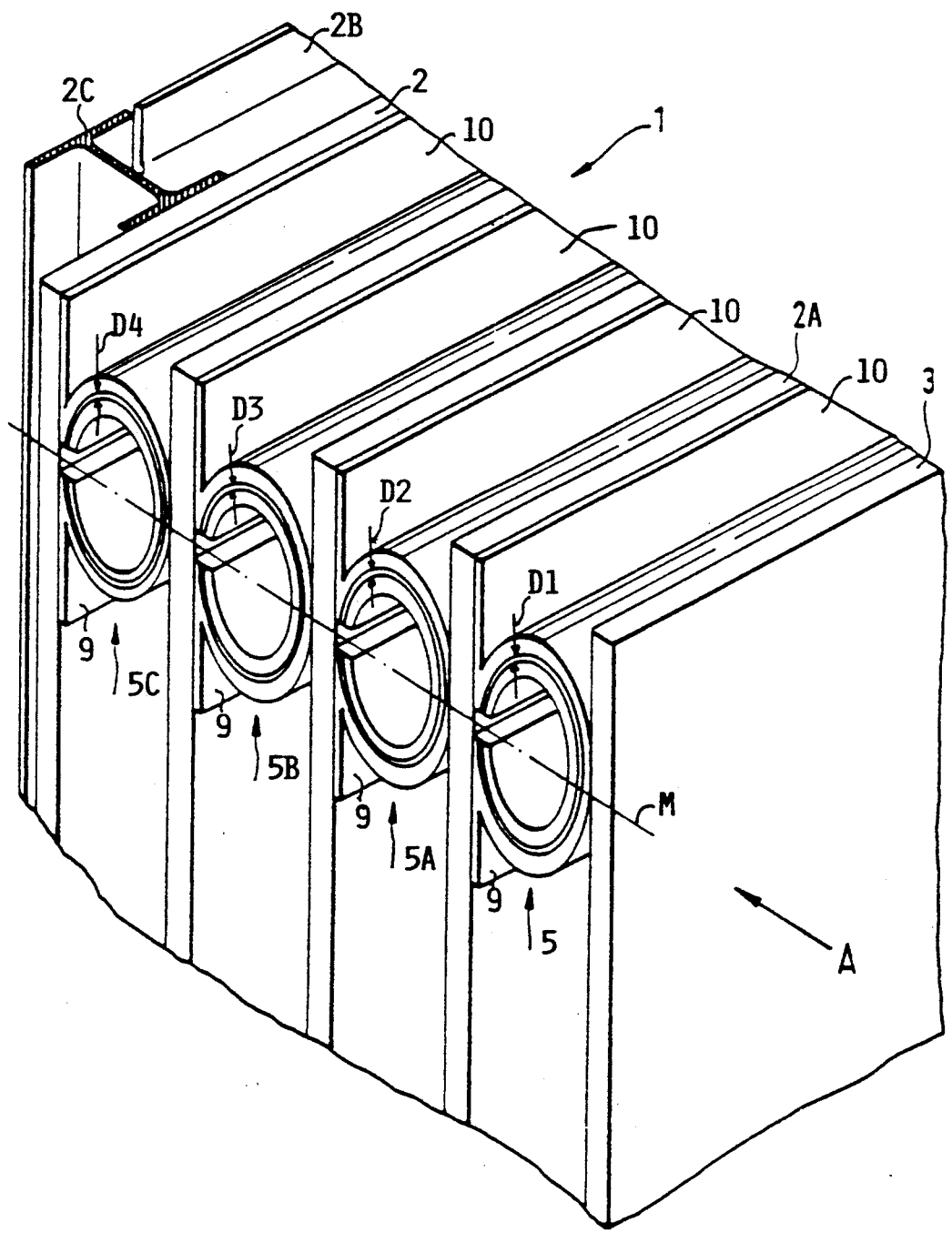
FIG. 2 is a view similar to that of FIG. 1, but showing, on an enlarged scale, the detail Z of FIG. 1.

FIG. 2 shows the detail Z of FIG. 1 illustrating a total of five wall sections 2, 3, and 2A, and four spring tubes 5, 5A, 5B, 5C. These four spring tubes form a group in the horizontal plane M. Each spring tube has an elliptical cross-section and is formed of three wall layers shown in more detail in FIG. 3. According to the invention, the wall thickness of the spring tubes or at least the thickness of an intermediate layer of the spring tubes, increases in the direction of the impact A. Thus, the wall thickness D1 of the spring tube 5 is smallest next to the front wall section 3. D2 is larger than D1, and so forth. D4 is larger than D3. Each of the spring tubes is equipped with two flanges 9 and 10 resting against the wall away from the first impact wall 3. The retaining wall 1 may rest against a bulkhead 2B including I-beams 2C.

Figure 3:
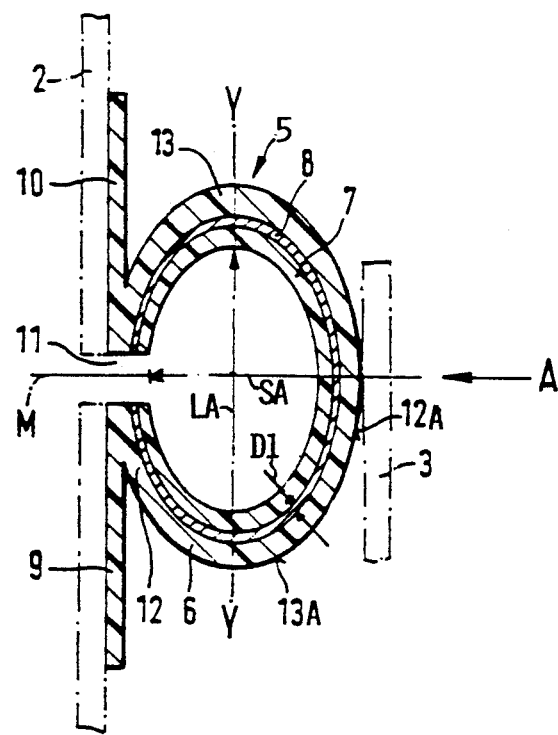
FIG. 3 is a sectional view perpendicularly to the longitudinal axis of an impact damper spring tube according to the invention.

FIG. 3 shows the sectional view of one embodiment of a spring tube 5 according to the invention, whereby the section plane extends perpendicularly to the longitudinal central axis of the hollow spring tube 5 which extends between the first or front wall section 3 facing the impact A and the section or rear wall section 2. Both wall sections are merely shown in dash-dotted lines. The shown embodiment comprises a tube wall structure with several layers, namely a radially outer layer 6, for example, of thermoplastic material, a radially inner layer 7, for example, of thermosetting material, or of metal, and an intermediate layer 8 of spring metal such as spring steel. The elastically yielding spring tube 5 has the above mentioned elliptical cross-section with a long axis LA extending in the plane Y—Y in parallel to the walls 2 and 3, and a short axis SA extending horizontally in the impact direction A. Two flanges 9 and 10 extend away in opposite directions and along the wall 2 in contact therewith. The tube 5 is, for example, adhesively bonded to the walls 2 and 3. Preferably, the flanges 9 and 10 enclose a through-slot 11 therebetween which permits controlling the spring characteristics of the tube 5. The flanges 9 and 10 extend perpendicularly to the central horizontal plane M in which also the short axis SA of the ellipse is located. The longitudinal gap 11 is preferably symmetrically arranged relative to the central plane M.

The tube 5 has two long wall segments 12 and 12A as well as two short wall segments 13 and 13A. The long wall segment 12A rests against the inner surface of the wall 3 and is properly bonded thereto, for example, by an adhesive. The long wall segment 12 is divided by the longitudinal gap 11 and is bonded to the wall 2 through the flanges 9 and 10. Preferably, the flanges 9 and 10 are extensions only of the outer wall layer 6 without the intermediate and inner layers 7 and 8. The short wall segments 13 and 13A bridge the space between the walls 2 and 3.

FIGS. 1 and 2 described above show that the spring tubes of a group are arranged in a common horizontal plane. However, the invention is not limited to this type of arrangement of the individual spring tubes of a group relative to each other. Rather, the members of a group could be staggered so that each tube 5, 5A, 5B, 5C is located in another horizontal plane so that the members of a group form a type of stairstep configuration. In both instances the longitudinal axes of the tubes preferably extend in parallel to each other.

As best seen in FIGS. 2 and 3, the flanges 9 and 10 are secured to the wall which is away from the impact facing wall. However, it is also possible to provide each longitudinal wall segment 12, 12A of the spring tubes 5 with flanges 9 and 10, whereby one set of flanges would contact the wall 2 as shown in FIG. 3, and the other set of flanges would contact the wall 3. However, the other set of flanges would not define a gap therebetween as shown at 11 for the flanges 9 and 10.

FIG. 3 also shows the thickness D1 of the intermediate layer 8. As mentioned, the further away the tubes are located from the impact wall 3, the thicker would be their intermediate wall layer 8. Where the walls have only one layer, again the thickness of that one layer could increase in a direction away from the impact wall.

Figure 4:
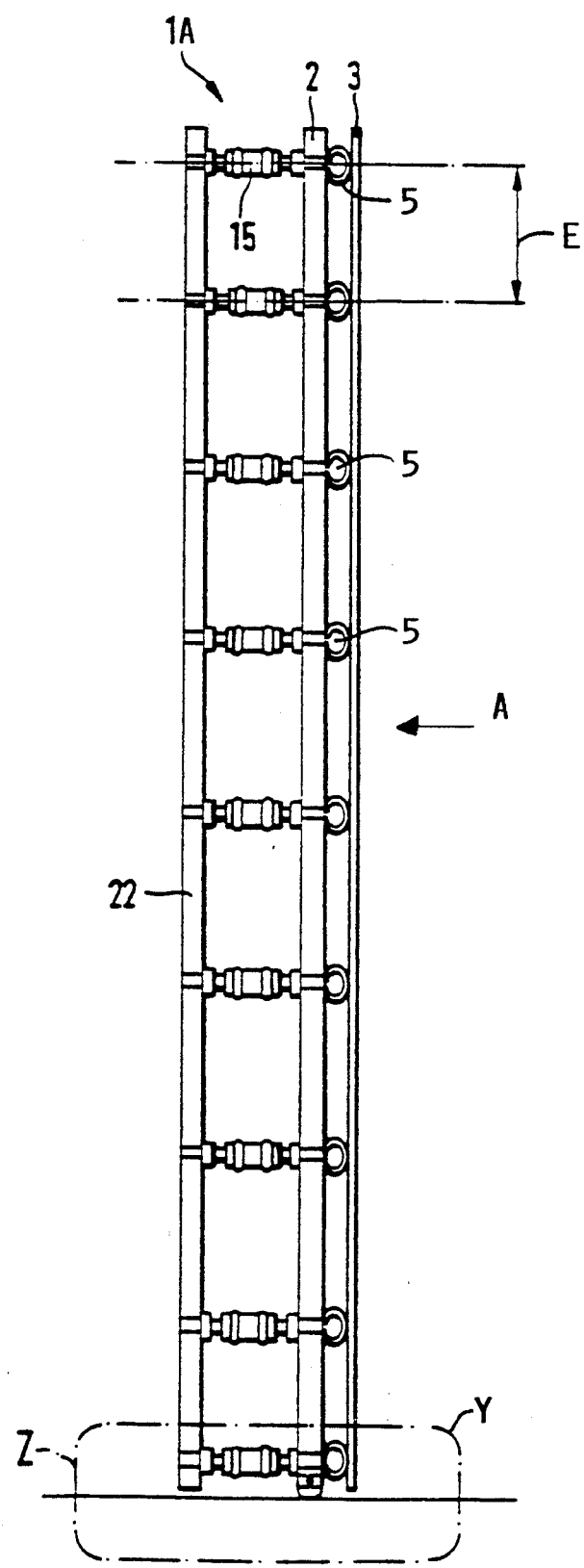
FIG. 4 is a side view of a further embodiment according to the invention combining an elastically yielding wall component with a plastically yielding wall component.

FIG. 4 shows a further retaining wall 1A according to the invention in a side view comprising the impact wall section 3 and a second wall section 2 enclosing a space in which the spring tubes 5 according to the invention are mounted. The spring tubes are vertically spaced from each other on-center by a spacing E. Additionally, a backing wall 22 is arranged in parallel to the walls 2 and 3 and spaced from the wall 2 sufficiently to mount in the respective spacing frictional energy absorbers 15 which as such are known. These energy absorbers 15 are horizontally aligned with the tubes 5, whereby the longitudinal axis of a tube 5 extends at right angles to the longitudinal axes of a plurality of frictional shock absorbers 15.

Figure 5:
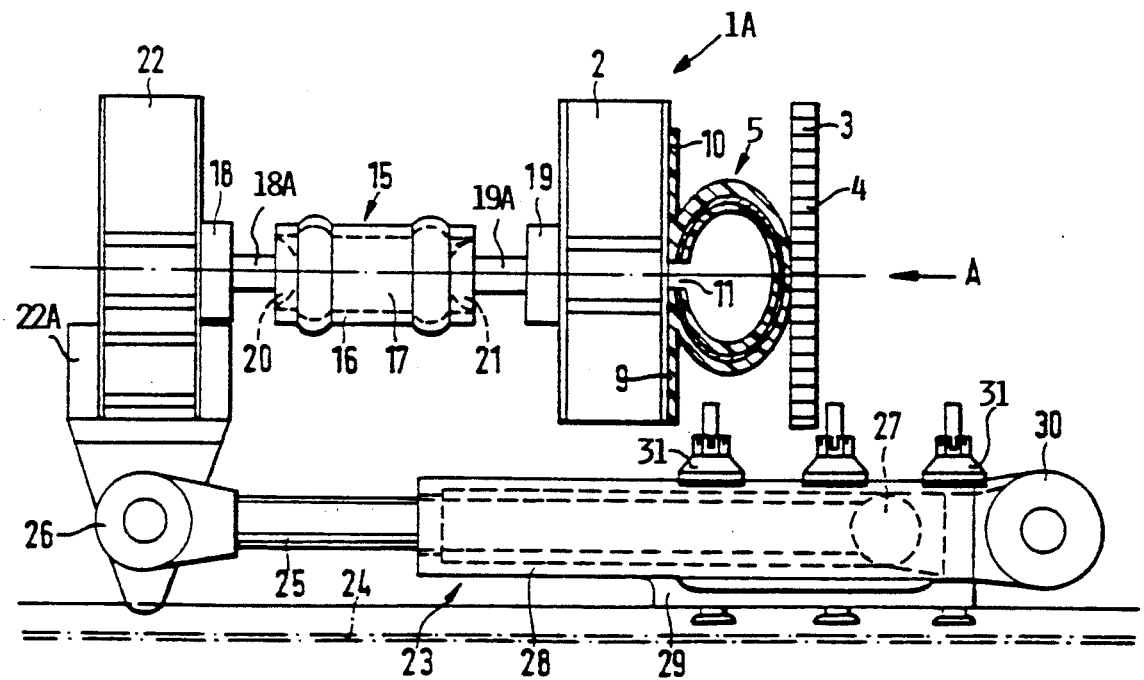
FIG. 5 shows, on an enlarged scale, the detail Y in FIG. 4.

FIG. 5 shows that each shock absorber 15 has an outer cylinder 16 with a bore 17 arranged between two flanges 18 and 19. Each flange carries a respective piston rod 18A and 19A which in turn carries a friction head 20 and 21 respectively reaching into the bore 17 of the cylinder 16. When, as a result of an impact, the wall 2 tends to move toward the backing wall 22, the friction heads 20 and 21 are forced into the cylinder 16, thereby plastically and permanently deforming the cylinder for absorbing impact energy. For this purpose the inner diameter of the cylinder 16, or rather the diameter of the bore 17 is somewhat smaller than the diameter of the friction heads 20 and 21 so that motion energy caused by an impact is converted into friction energy and heat.

Referring further to FIG. 5, the flange 18 is secured to the backing wall 22 and the flange 19 is secured to the second wall section 2 so that the central longitudinal axis of the frictional shock absorber 15 is horizontally aligned with the impact direction.

FIG. 5 further shows that the wall is mounted to the aircraft floor with the aid of a mounting rail 24 and with a frictional shock absorber piston cylinder device 23. The device 23 has a piston rod 25 having a friction ball 27 reaching into a bore of a cylinder 28 with a friction fit. The opposite end of the piston rod 25 is pivoted or journalled at 26 to a bracket 22A in which the backing wall 22 is mounted. The device 23, or rather its cylinder 28, is journalled at 30 to a mounting bracket 29 which in turn is secured to the rail 23 by conventional means such as screws with crown nuts 31. The diameter of the friction ball 27 is larger than the inner diameter of the bore in the cylinder 28 for a friction energy absorption.

The arrangement of FIG. 5 is such that a three-step energy absorption is achieved. First, a relatively small impact will be taken up elastically by the spring tubes 5 between the walls 2 and 3. Incidentally, the wall 3 is provided with the above mentioned honeycombed core 4 in its interior. Second, the movement of the walls 2 and 3 to the left in FIG. 5 will cause a plastical deformation of the friction shock absorbers 15. Third, when the shock absorbing capacity of the absorbers 15 is exhausted, that is when they are fully deformed, the wall 22 will move to the left, thereby pulling the ball 27 into the cylinder 28. The pivot or journal 30 facilitates the mounting of the retaining wall by providing some leeway and permitting some tilting of the wall into its final position prior to the securing of the screws and nuts 31.

Although the invention has been described with reference to specific example embodiments, it will be appreciated, that it is intended to cover all modifications and equivalents within the scope of the appended claims.

What I claim is:

1. A retaining wall for intercepting and holding cargo in an aircraft cabin, comprising an impact facing first wall section, a second wall section spaced from said first wall section, and a plurality of longitudinal hollow spring tubes sandwiched between said first and second wall sections, each of said longitudinal hollow spring tubes having an elliptical hollow cross-section and an elastic spring characteristic, each of said hollow spring tubes comprising a tube wall having a plurality of elastic layers forming said elliptical hollow cross-section, and wherein said plurality of elastic layers comprises a first elastic layer made of thermoplastic material, a second layer made of thermosetting material, and a third elastic layer made of spring metal.

2. The retaining wall of claim 1, further comprising at least one intermediate wall section arranged between said first and second wall sections, spaces between said intermediate wall section and each of said first and second wall sections, said hollow spring tubes being arranged in each of said spaces on both sides of said intermediate wall section.

3. The retaining wall of claim 2, comprising a plurality of intermediate wall sections between said first and second wall sections and spaces between neighboring wall sections, said hollow spring tubes being arranged in each of said spaces.

4. The retaining wall of claim 3, wherein said hollow spring tubes are arranged in horizontal groups so that a vertical spacing (E) is provided between neighboring groups, and so that hollow spring tubes of a group are arranged in a row one tube behind another tube of the same group as viewed in an impact direction (A), whereby the spring tubes of any group are separated from one another by said intermediate wall sections.

5. The retaining wall of claim 4 wherein each of said hollow spring tubes has a tube wall of elastic material having said elliptical hollow cross-section, said tube wall having a longitudinal slot therein, said tube wall forming two flanges alongside said slot, said two flanges resting against an intermediate wall section opposite said impact facing first wall section and wherein all of said hollow spring tubes of a group are arranged so that their respective two flanges rest against a wall section away from said impact facing wall section.

6. The retaining wall of claim 1, wherein said first elastic layer is a radially outer elastic layer made of thermoplastic material, wherein said second layer is a radially inner layer made of thermosetting material, and wherein said third elastic layer is an intermediate elastic layer made of spring metal.

7. The retaining wall of claim 1, wherein said first elastic layer is a radially outer elastic layer made of thermoplastic material, wherein said second layer is a radially inner layer made of a metal, and wherein said third elastic layer is an intermediate layer made of a spring metal.

8. The retaining wall of claim 1, wherein each of said hollow spring tubes with said elliptical hollow cross-section has two long wall segments spaced from each other by a short axis of said elliptical cross-section and two short wall segments spaced from each other by a long axis of said elliptical cross-section, said long wall segments resting against surfaces of said first and second wall sections, said short wall segments bridging a spacing between said first and second wall sections.

9. The retaining wall of claim 8, wherein one of said long wall segments has a longitudinal through slot therein, and wherein said one long wall segment forms two flanges extending in opposite directions away from said slot, said flanges contacting said second wall section.

10. A retaining wall for intercepting and holding cargo in an aircraft cabin, comprising an impact facing first wall section, a second wall section spaced from said first wall section, and a plurality of longitudinal hollow spring tubes sandwiched between said first and second wall sections, each of said longitudinal hollow spring tubes having an elliptical hollow cross-section and an elastic spring characteristic, wherein said hollow spring tubes comprise a tube wall of elastic material having said elliptical hollow cross-section, said tube wall having a longitudinal through-slot therein, said elliptical hollow cross-section having a long axis extending in parallel to said first and second wall sections and a short axis extending perpendicularly to said first and second wall sections, said tube wall forming two flanges alongside said slot.

11. The retaining wall of claim 10, wherein said flanges extend in opposite directions away from said slot and in parallel to said long axis of said elliptical cross-section.

12. The retaining wall of claim 10, wherein said tube wall comprises a plurality of layers including a radially outer layer, said flanges being formed only by said radially outer layer extending in opposite directions away from said slot.

13. The retaining wall of claim 10, wherein said two flanges rest against one of said first and second wall sections, wherein said tube wall has, opposite said two flanges, a long wall segment resting against another of said first and second wall sections, and wherein said tube wall has two short wall segments opposite each other, said two short wall segments bridging a spacing between said first and second wall sections.

14. The retaining wall of claim 13, wherein said long wall segment rests against said impact facing first wall section and wherein said two flanges rest against said second wall section.

15. A retaining wall for intercepting and holding cargo in an aircraft cabin, comprising an impact facing first wall section, a second wall section spaced from said first wall section, and a plurality of longitudinal hollow spring tubes sandwiched between said first and second wall sections, each of said longitudinal hollow spring tubes having an elliptical hollow cross-section and an elastic spring characteristic, wherein each of said hollow spring tubes has a tube wall comprising at least a radially outer wall layer, a radially inner wall layer and an intermediate layer between said inner and outer tube wall layers, said intermediate layer comprising an elastic material.

16. The retaining wall of claim 15, wherein said plurality of intermediate spring tubes is arranged in groups so that the tubes of a group are positioned in a common horizontal plane, and wherein intermediate layers of said tube walls of a group of said hollow spring tubes have a thickness (D1, D2, D3, ...) that increases in an impact direction from one tube to the next tube in the same group in said impact direction.

17. A retaining wall for intercepting and holding cargo pieces in an aircraft cabin, said wall dividing said aircraft cabin into a cargo hold and into a passenger space, comprising an impact facing first wall section, a second wall section spaced from said first wall section, and a plurality of longitudinal hollow elastic spring tues having an elastic spring characteristic, said elastic spring tubes being sandwiched between said first and second wall sections, each of said elastic spring tubes having an elliptical hollow cross-section, and a third wall section spaced from said second wall section, mechanical friction energy absorber means arranged between said second and third wall sections for cooperation with said elastic spring tubes, whereby an elastic energy damping is performed by said elastic spring tubes prior to a friction energy absorption by said friction energy absorber means which are plastically and permanently deformed.

18. The retaining wall of claim 17, further comprising a friction energy absorption means for mounting said third wall section to a floor of the aircraft, said friction energy absorbing means comprising a piston cylinder device with a friction element inside said piston cylinder device connected to said third wall section through a piston rod, whereby a three-stage energy absorption is achieved.

* * * * *